US012639281B2

(12) United States Patent
Cramer et al.

(10) Patent No.: US 12,639,281 B2
(45) Date of Patent: May 26, 2026

(54) DATABASE CATALOGUING USING SIMILARITY HASH CODE

(71) Applicant: BAYER AKTIENGESELLSCHAFT, Leverkusen (DE)

(72) Inventors: Joerg Cramer, Wermelskirchen (DE); Naghman Waheed, Saint Louis, MO (US); Sujit Thapa, Erlangen (DE); Robert Schmidt, Cologne (DE)

(73) Assignee: BAYER AKTIENGESELLSCHAFT, Leverkusen (DE)

( * ) Notice: Subject to any disclaimer, the term of this patent is extended or adjusted under 35 U.S.C. 154(b) by 0 days.

(21) Appl. No.: 18/785,877

(22) Filed: Jul. 26, 2024

(65) Prior Publication Data

US 2025/0036609 A1     Jan. 30, 2025

Related U.S. Application Data

(60) Provisional application No. 63/529,584, filed on Jul. 28, 2023.

(30) Foreign Application Priority Data

Sep. 20, 2023     (EP) ..................................... 23198540

(51) Int. Cl.
G06F 16/00          (2019.01)
G06F 16/22          (2019.01)
G06F 16/248         (2019.01)

(52) U.S. Cl.
CPC ........ *G06F 16/2255* (2019.01); *G06F 16/248* (2019.01)

(58) Field of Classification Search
CPC ..... G06F 16/00; G06F 16/248; G06F 16/2255
See application file for complete search history.

(56) References Cited

U.S. PATENT DOCUMENTS 10,866,971  B2 *  12/2020  Bensberg ............ G06F 16/9014
2019/0171665  A1    6/2019  Navlakha et al.
2021/0103434  A1 *  4/2021  Venkat ................ G06F 16/2255

OTHER PUBLICATIONS

F. Pagani et al.: Beyond Precision and Recall: Understanding Uses (and Misuses) of Similarity Hashes in Binary Analysis, Proceedings of the Eighth ACM Conference on Data and Application Security and Privacy, 2018 (12 pages).
M. Martin-Perez et al.: Bringing order to approximate matching: Classification and attacks on similarity digest algorithms, Forensic Science International: Digital Investigation, 36, 2021, 301120 (9 pages).
Dcfldd—Latest version 1.3.4-1, sourceforge.net, 2006 (2 pages).
Kornblum, J., Identifying almost identical files using context triggered piecewise hashing, Science Direct, Digital Investigation 3S (2006) S91-S97.
Roussev, V. et al., md5bloom: Forensic filesystem hashing revisited, Science Direct, Digital Investigation 3S (2006) S82-S90.

(Continued)

*Primary Examiner* — Cheryl Lewis
(74) *Attorney, Agent, or Firm* — Harness, Dickey & Pierce, P.L.C.

(57) ABSTRACT

Computer-implemented methods, computer systems, and computer programs of the present disclosure relate to database cataloguing, information identification based on similarities, and information retrieval.

16 Claims, 5 Drawing Sheets

(56)        References Cited

OTHER PUBLICATIONS

Roussev, V. et al., Multi-resolution similarity hashing, Science Direct, Digital Investigation 4S (2007) S105-S113.

Sdhash/sdbf /sdbf_defines; github.com, 2013 (3 pages).

F. Breitinger, H. Baier: Similarity preserving hashing: eligible properties and a new algorithm MRSH-v2, 2012 (17 pages).

C. Sadowski. G. Levin: SimHash: Hash-Based Similarity Detection, Technical Report, 2007, University of California, Santa Cruz (10 pages).

F. Breitinger et al.: mvHash-B—a new approach for similarity preserving hashing, Seventh International Conference on IT Security Incident Management and IT Forensics, 2013, 33-44.

Raff, E. et al., An Alternative to NCD for Large Sequences, Lempel-Ziv Jaccard Distance, ACM Digital Library, Abstract, 2017 (5 pages).

E. Damiani, et al.: An open digest-based technique for spam detection, In: Proceedings of the 2004 International Workshop on Security in Parallel and Distributed Systems, 2004, pp. 559-564.

J. Oliver, et al.: TLSH—a locality sensitive hash, Fourth Cybercrime and Trustworthy Computing Workshop, 2013, IEEE, pp. 7-13.

Chang, D. et al., FbHash: A New Similarity Hashing Scheme for Digital Forensics, Digital Investigation 29 (2019) S113-S123.

S. Chaidaroon et al.: node2hash: Graph aware deep semantic text hashing, Information Processing and Management 57 (2020) 102143 (15 pages).

F. Breitinger, H. Baier: Properties of a Similarity Preserving Hash Function and their Realization in sdhash, 2012 (8 pages).

J. De Goer De Herve et al.: A perceptual hash function to store and retrieve large scale DNA sequences, 2014 (9 pages).

F. Breitinger et al.: Similarity Hashing Based On Levenshtein Distances, Advances in Digital Forensics X (Chapter 10), Springer, 2014 (15 pages).

F. Breitinger et al.: Using Approximate Matching To Reduce The Volume of Digital Data, Advances in Digital Forensics X (Chapter 11), Springer, 2014 (35 pages).

* cited by examiner

FIG. 1(c)

DATABASE CATALOGUING USING SIMILARITY HASH CODE

CROSS-REFERENCE TO RELATED APPLICATIONS

This application claims the benefit of, and priority to, U.S. Provisional Application No. 63/529,584, filed Jul. 28, 2023, and European Patent Application No. 23198540.9, filed Sep. 20, 2023. The entire disclosure of each of the above applications is incorporated herein by reference.

FIELD

Computer-implemented methods, computer systems, and computer programs of the present disclosure relate to database cataloguing, information identification based on similarities, and information retrieval.

BACKGROUND

This section provides background information related to the present disclosure which is not necessarily prior art.

Nowadays, the real world is represented digitally in many forms. For many objects and subjects in the real world, there is information stored in digital form.

For example, there are digital catalogues for books in libraries that store digital representations of the books with various attributes such as the author's name, the publisher, the year of publication, and the location where the respective book can be found in the library.

For patients, there are electronic health records that store identity and health information about each patient.

Shops that offer goods online not only have data stored about the goods they offer, but also data about their customers, such as what a customer bought and when.

There are databases on crop protection products, pharmaceuticals, active ingredients, formulations and other chemical substances and/or compositions in which properties of the chemical substances/compositions such as biological activity, toxicological data, physical and/or chemical properties, synthesis schemes, availabilities, formulations, and the like are stored.

Data about objects and/or subjects often exist in the form of tables in databases.

In relational databases, and flat file databases, a table is a set of data elements using a model of vertical columns and horizontal rows, the cell being the unit where a row and column intersect. A table has a specified number of columns, but can have any number of rows. Each row is identified by one or more values appearing in a particular column subset. A specific choice of columns which uniquely identify rows is called the primary key.

Usually, a column in a table represents an attribute of a particular attribute type. To return to the example of books in a library: examples of attributes are the author's name (attribute type: string) and the year of publication (attribute type: (decimal) number).

Attribute values are listed in each row; thus, for example, the respective name of an author of a book or the respective year of publication of the book can be stored in a data cell.

If a database is searched for a piece of information (e.g., for a person by name), in principle all data cells of all tables in the database can be checked to see if they contain the information (e.g., the name of the person).

However, such a search would not be efficient, since it would search cells that cannot contain a name due to their different attribute type, for example.

Besides the actual data rows, tables may have associated with them some metadata, such as constraints on the table or on the values within particular columns.

Such metadata can help to make the search for specific information more efficient. If necessary, the metadata can be used to determine whether a table and/or a column in a table can contain the information searched for at all. Tables and/or columns that cannot contain the information sought can be sorted out in advance.

However, metadata is often incomplete and/or there is no metadata at all.

Metadata is often created manually by different users. Metadata may be incorrect and/or may have been assigned by different users according to subjective points of view and thus be inconsistent.

SUMMARY

This section provides a general summary of the disclosure and is not a comprehensive disclosure of its full scope or all of its features.

These and other problems are addressed by the subject matter of the present disclosure.

The present disclosure provides a means for locating information in databases, even if not all information contains metadata and/or information is associated with erroneous and/or inconsistent metadata.

in a first aspect, the present disclosure relates to a computer-implemented method, the method comprising: providing a database, the database comprising a multitude of tables, each table comprising a multitude of data elements, each data element being characterized by at least one attribute value of at least one attribute, each attribute being associated with an attribute type; generating a similarity hash for each attribute of a multitude of attributes of the database at least partially based on a similarity hash of a sample set of attribute values of the attribute; identifying similarities between attributes based on their similarity hashes; generating an attribute catalogue based on the similarity hashes of the attributes and the identified similarities; receiving a search query, wherein the search query is associated with a searched attribute value of an attribute; localizing the attribute of the searched attribute value in the catalogue; identifying one or more other attributes that are similar to the attribute of the searched attribute value based on the catalogue; outputting information related to the at least one other attribute.

In another aspect, the present disclosure provides a computer system comprising: a processor; and a memory storing an application program configured to perform, when executed by the processor, an operation, the operation comprising: providing a database, the database comprising a multitude of tables, each table comprising a multitude of data elements, each data element being characterized by at least one attribute value of at least one attribute, each attribute being associated with an attribute type; generating a similarity hash for each attribute of a multitude of attributes of the database at least partially based on a similarity hash of a sample set of attribute values of the attribute; identifying similarities between attributes based on their similarity hashes; generating an attribute catalogue based on the similarity hashes of the attributes and the identified similarities; receiving a search query, wherein the search query is associated with a searched attribute value of an attribute; localizing the attribute of the searched attribute value in the catalogue; identifying one or more other attributes that are similar to the attribute of the searched attribute value based on the catalogue; outputting information related to the at least one other attribute.

In another aspect, the present disclosure provides a non-transitory computer readable storage medium having stored thereon software instructions that, when executed by a processor of a computer system, cause the computer system to execute the following steps: providing a database, the database comprising a multitude of tables, each table comprising a multitude of data elements, each data element being characterized by at least one attribute value of at least one attribute, each attribute being associated with an attribute type; generating a similarity hash for each attribute of a multitude of attributes of the database at least partially based on a similarity hash of a sample set of attribute values of the attribute; identifying similarities between attributes based on their similarity hashes; generating an attribute catalogue based on the similarity hashes of the attributes and the identified similarities; receiving a search query, wherein the search query is associated with a searched attribute value of an attribute; localizing the attribute of the searched attribute value in the catalogue; identifying one or more other attributes that are similar to the attribute of the searched attribute value based on the catalogue; outputting information related to the at least one other attribute.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only of selected embodiments, are not all possible implementations, and are not intended to limit the scope of the present disclosure.

Corresponding reference numerals indicate corresponding parts throughout the several views of the drawings.

DETAILED DESCRIPTION

Figure 1A:
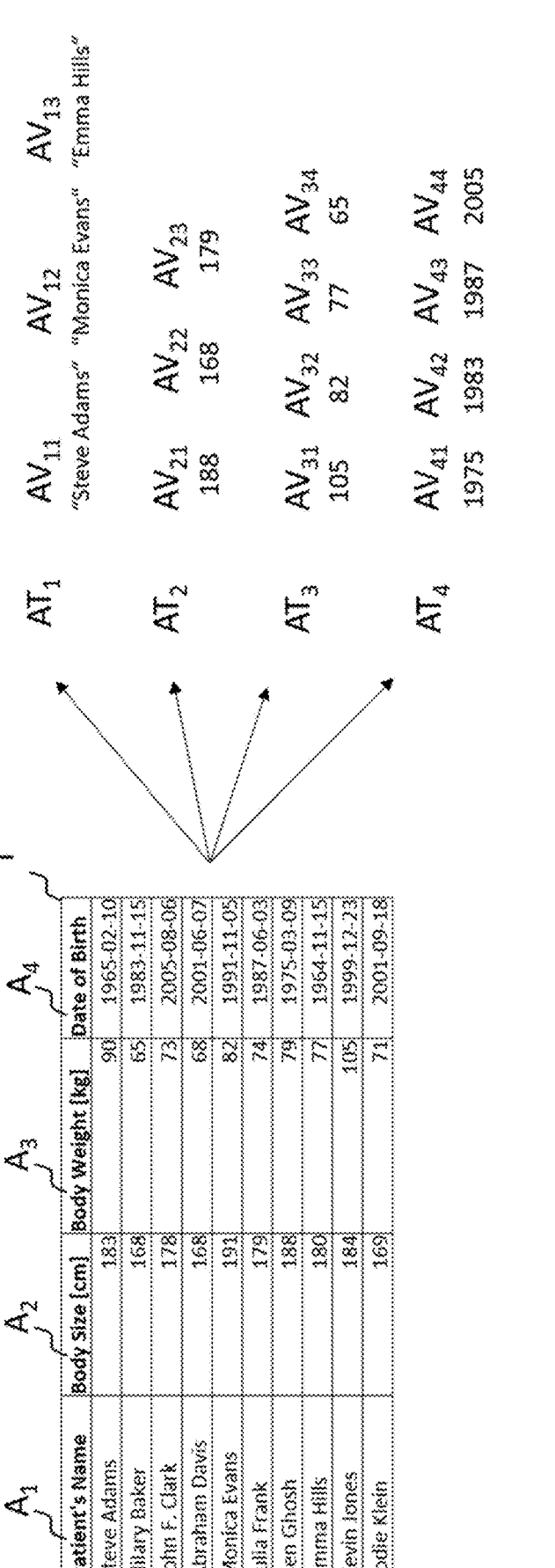
FIGS. 1 (*a*), 1 (*b*), and 1 (*c*) show schematically and exemplarily the generation of similarity hashes for four attributes.

Various example embodiments will be more particularly elucidated below without distinguishing between the aspects of the disclosure (method, computer system, computer-readable storage medium). On the contrary, the following elucidations are intended to apply analogously to all the aspects of the disclosure, irrespective of in which context (method, computer system, computer-readable storage medium) they occur.

If steps are stated in an order in the present description or in the claims, this does not necessarily mean that the disclosure is restricted to the stated order. On the contrary, it is conceivable that the steps can also be executed in a different order or else in parallel to one another, unless, for example, one step builds upon another step, this requiring that the building step be executed subsequently (this being, however, clear in the individual case). The stated orders may thus be exemplary embodiments of the present disclosure.

As used herein, the articles "a" and "an" are intended to include one or more items and may be used interchangeably with "one or more" and "at least one." As used in the specification and the claims, the singular form of "a", "an", and "the" include plural referents, unless the context clearly dictates otherwise. Where only one item is intended, the term "one" or similar language is used. Also, as used herein, the terms "has", "have", "having", or the like are intended to be open-ended terms. Further, the phrase "based on" is intended to mean "based at least partially on" unless explicitly stated otherwise. Further, the phrase "based on" may mean "in response to" and be indicative of a condition for automatically triggering a specified operation of an electronic device (e.g., a controller, a processor, a computing device, etc.) as appropriately referred to herein.

Some implementations of the present disclosure will be described more fully hereinafter with reference to the accompanying drawings, in which some, but not all implementations of the disclosure are shown. Indeed, various implementations of the disclosure may be embodied in many different forms and should not be construed as limited to the implementations set forth herein; rather, these example implementations are provided so that this disclosure will be thorough and complete, and will fully convey the scope of the disclosure to those skilled in the art.

Some terms are written in italics in this disclosure (e.g., attribute values similarity hash, attribute type similarity hash, attribute similarity hash). However, this is only done to improve readability.

The present disclosure provides a means for locating information in databases.

A "database" is an organized collection of data stored and accessed electronically through the use of a database management system. A "database management system" is the software that interacts with end users, applications, and the database itself to capture and analyse the data.

Both a database and its database management system conform to the principles of a particular data model.

A "data model" is an abstract model that organizes elements of data and standardizes how they relate to one another and to the properties of real-world entities. Data models describe the structure, manipulation, and integrity aspects of the data stored in data management systems such as relational databases. An example of a data model is the relational model.

The "relational model" is an approach to managing data using a structure and language consistent with first-order predicate logic, where all data is represented in terms of tuples, grouped into relations. A database organized in terms of the relational model is a "relational database".

In database theory, a "relation" is a set of tuples, where each element is a member of a data domain. A "data domain" is the collection of values that a data element may contain.

Each element of the set of tuples is termed an "attribute value". An "attribute" is a specification that defines a property of an object or subject. An attribute can be assigned an "attribute type" that specifies which attribute values the attribute can take (e.g., characters or digits or the like). An attribute type can also specify operations that can be performed on or with the attribute values.

Information can be stored in the form of data. Data can represent information. For the following description, it is assumed that information is stored in the form of data in one or more databases. For simplicity, it is assumed that there is only one database; however, it is possible that there are multiple databases, i.e., information may be searched in several databases in parallel. In other words, the present disclosure is not limited to one database, even though it is predominantly described with reference to embodiments with only one database. It is further assumed that the data in the database is in the form of tables. Here, the term table is meant to be generic as any relation between data and not restrictive. Furthermore, embodiments are described using the relational model as an example, without intending to limit the disclosure to this data model. The person skilled in the art of information technology knows how to apply the teachings of the present disclosure to other data models.

Starting point of the present disclosure may be a database comprising a multitude of tables. Each table comprises a multitude of data elements, each data element being characterized by at least one attribute value of at least one attribute. Each attribute is associated with an attribute type.

For example, such a table may represent one or more chemical and/or biological substances. Attributes may represent the properties of the chemical and/or biological substance(s). For example, an attribute can be the name of the chemical or biological substance(s). The name can be, for example, the name according to the IUPAC (International Union of Pure and Applied Chemistry) nomenclature or a common name (such as ethanol) or an identifier (such as the CAS number of the American Chemical Society). An attribute can be a chemical formula (such as $C_2H_5OH$) or a code representing a structural formula (such as the SMILES (Simplified Molecular-Input Line-Entry System) code or the InChI (International Chemical Identifier) code) or a molecular graph. An attribute may be a molecular weight or a melting point or a boiling point or some other physicochemical property. An attribute may be a biological activity.

A table may also represent one or more compositions (e.g., formulations) of several chemical and/or biological substances. Attributes may represent components of the composition, quantities of the components, the nature of the composition, steps taken to prepare the composition, and/or properties of the composition and/or its components.

Tables may represent processes, such as synthesis processes, production processes, formulation techniques, application techniques, and/or other processes. Attributes may represent process parameters.

Tables may represent machines such as production equipment, packaging equipment, medical equipment for diagnosis and/or therapy of diseases, agricultural machinery for processing agricultural fields and/or greenhouses, sensors, robots, computers, computer peripherals, network components, and/or other items. Attributes may represent locations, availabilities, usages, workloads, productivities, maintenance intervals, and/or other properties.

Tables may represent people such as patients. Attributes may represent patient's name, gender, age, height, weight, blood type, blood pressure values, existing and/or survived diseases, information about medications taken or to be taken, and/or other health information.

Tables may represent commercial transactions such as orders, invoices, sales, income statements, taxes or any information captured for commercial operations.

In a first step, a catalogue may be created to the database. The catalogue may serve as an entry point and filter when later searching for information in the database. Such a catalogue usually includes for each attribute where the attribute can be found (e.g., in which table(s)) in the database.

In such a catalogue, metadata may be stored for each attribute (or at least for a part of the attributes) of each table (or at least for a part of the tables) in the database.

In an embodiment of the present disclosure, this metadata is generated automatically as described below. "Automatically" means without the intervention of a human being.

In a further step, a similarity hash for a multitude of attributes of the database may be generated. In an embodiment of the present disclosure, for each attribute of a majority of the attributes of the database a similarity hash is generated. In an embodiment of the present disclosure, a similarity hash is generated for each attribute of each table in the database.

Similarity hashing algorithms, also known as approximate hashing or fuzzy hashing, were introduced in the field of computer security, particularly for spam detection and correlating forensic artifacts (see, e.g.: F. Pagani et al.: Beyond Precision and Recall: Understanding Uses (and Misuses) of Similarity Hashes in Binary Analysis, Proceedings of the Eighth ACM Conference on Data and Application Security and Privacy, 2018, DOI:10.1145/3176258.3176306).

Unlike cryptographic hashes (e.g., MD5 or SHA512), similarity hashes can be compared to find similar pieces of data. Similarity hashing algorithms have been developed to overcome the limitations of cryptographic hashes and demonstrate robustness against both small and significant changes.

There are a variety of different similarity hashing algorithms that can be used. An overview of similarity hashing algorithms is given, for example, in the following article: M. Martín-Pérez et al.: *Bringing order to approximate matching: Classification and attacks on similarity digest algorithms*, Forensic Science International: Digital Investigation, 36, 2021, 301120.

In an embodiment of the present disclosure, the similarity hashing algorithm has one or more of the following characteristics:

Ease of computation: The similarity hash function algorithm is computationally efficient to allow fast generation and comparisons.

Coverage: Each byte of input affects the output to ensure that even small changes can be detected.

Compression: The output of the similarity hashing algorithm is significantly smaller than the input to save memory capacity and allow efficient computation of the comparison function.

Similarity hashing algorithms usually operate according to the following scheme: they accept data as input, generate a similarity hash code, briefly referred to as a similarity hash in this disclosure, and output this similarity hash as output. Once a similarity hash has been generated, it can be compared with other similarity hashes generated analogously for other data to identify similar data based on similar hashes. It is assumed that the more similar two data sets are, the more similar their similarity hashes are and vice versa.

In an embodiment of the present disclosure, similarity hashes are generated using feature space hashing. Feature space hashing algorithms partition the input data into features and evaluate similarity based on sequences of these features. Examples of similarity hashing algorithms that follow this approach are:

dcfldd (http://dcfldd.sourceforge.net/), ssdeep (https://doi.org/10.1016/j.diin.2006.06.015), md5bloom (https://doi.org/10.1016/j.diin.2006.06.012), MRS hash (https://doi.org/10.1016/j.diin.2007.06.011), sdhash (https://github.com/sdhash/sdhash/blob/master/sdbf/sdbf_defines.h #L58), and MRSH-V2 (F. Breitinger, H. Baier: *Similarity preserving hashing: eligible properties and a new algorithm MRSH*-v2, Digital Forensics and Cyber Crime Rogers, Springer, 2013, 167-182).

In an embodiment of the present disclosure, similarity hashes are generated using byte sequence hashing. Byte sequence hashing algorithms detect the presence or similarity of byte sequences (blocks) within the input data. Examples of similarity hashing algorithms that follow this approach are:

Simhash (C. Sadowski. G. Levin: SimHash: Hash-Based Similarity Detection, Technical Report, 2007, University of California, Santa Cruz), mvHash-B (F. Breitinger et al.: *mvHash-B—a new approachfor similarity preserving hashing*, Seventh International Conference on IT Security Incident Management and IT Forensics, 2013, 33-44), and LZJD (https://doi.org/10.1145/3097983.3098111).

In an embodiment of the present disclosure, similarity hashes are generated using locality sensitive hashing. Locality sensitive hashing algorithms aim to group similar objects into the same bucket with a high probability by mapping objects into buckets. Examples of similarity hashing algorithms that follow this approach are:

Nilsomsa (E. Damiani, et al.: *An open digest-based technique for spam detection*, In: Proceedings of the 2004 International Workshop on Security in Parallel and Distributed Systems, 2004, pp. 559-564), TLSH (J. Oliver, et al.: *TLSH—a locality sensitive hash*, Fourth Cybercrime and Trustworthy Computing Workshop, 2013, IEEE, pp. 7-13), saHash (https://doi.org/10.1007/978-3-662-44952-3_10), and FbHas (https://doi.org/10.1016/j.diin.2019.04.006).

The similarity hash for an attribute is based at least partially on a similarity hash of a sample set of attribute values of the attribute. The similarity hash for an attribute can be based on additional data.

A sample set of attribute values is selected for each attribute (or at least for a selection of attributes) and a similarity hash is generated for each sample set.

For example, it is possible to select a predefined number (e.g., 2, or 3, or 4, or 5, or 6, or 10, or 15, or 100, or some other number) or a defined proportion (e.g., 1% or 2% or 3% or 4% or 5% or 6% or 7% or 8% or 9% or 10% or 10.3% or some other proportion) of samples at random or according to predetermined rules.

If the attribute values are numbers, statistical quantities of the attribute values can also be generated instead of or in addition to the attribute values and used as a sample set or part of the sample set of the attribute values. For example, a maximum attribute value (the largest attribute value associated with the attribute), a minimum attribute value (the smallest attribute value associated with the attribute), a mean attribute value (e.g., the arithmetic mean and/or the geometric mean), one or more quantiles (e.g., terciles, quartiles, quintiles and/or others) and/or other/further values and/or statistical quantities may be determined and/or selected.

One or more similarity hashes are generated from the sample set of attribute values. For example, it is possible to generate a similarity hash from each attribute value in the sample set. For example, if the attribute value is a number (e.g., a patient's blood pressure), then that number may be fed to the similarity hashing algorithm and the similarity hashing algorithm generates a similarity hash for the number.

It is also possible that similarity hashes are generated from all attribute values of an attribute and samples are then selected from these similarity hashes.

It is also possible to generate a list of selected attribute values (e.g., in descending or ascending order), and then generate a similarity hash of this list.

If individual similarity hashes have been generated for individual attribute values, the individual similarity hashes can be combined into a combined similarity has. The combination can be done, for example, by concatenating the individual similarity hashes.

The similarity hashes of the attribute values can be sorted before the combined similarity hash is generated. For example, if the attribute values are numbers, the similarity values can be sorted according to the size of the numbers from which they were generated (ascending or descending).

The similarity hash generated from the sample set of attribute values is referred to as the attribute values similarity hash herein. A similarity hash for an attribute can be such an attribute values similarity hash.

As already mentioned above, the similarity hash for an attribute can be based on further data.

For example, information about the attribute type can be included in the similarity hash for an attribute.

For example, the attribute type can be included in the similarity hash in the form of a categorical variable. Preferably, a similarity hash is generated from each attribute type and the attribute type similarity hash thus generated is combined with the attribute values similarity hash. The combination can be done, for example, by concatenating the attribute type similarity hash and the attribute value similarity hash.

Each attribute type can be fed to a similarity hashing algorithm and the similarity hashing algorithm generates the similarity hash for the attribute type (resulting in an attribute type similarity hash). For example, if the attribute type is "string" then the string "string" can be fed to the similarity hashing algorithm and the similarity hashing algorithm generates an attribute type similarity hash from this attribute type.

When concatenating the attribute type similarity hash and the attribute values similarity hash, the attribute type similarity hash may precede the attribute values similarity hash.

Likewise, it is possible to include information about the attribute itself in the similarity hash of each attribute. For example, a similarity hash can also be generated from each attribute and this attribute similarity hash can be combined with the attribute values similarity hash and, if present, the attribute type similarity hash (for example, by concatenation).

To generate an attribute similarity hash, the attribute can be fed to a similarity hashing algorithm and the similarity hashing algorithm generates the attribute similarity hash. For example, if the attribute is "patient's name", the string "patient's name" is fed to the similarity hashing algorithm and the similarity hashing algorithm generates an attribute similarity hash for this attribute.

When multiple similarity hashes are generated and combined into one (combined/single) similarity hash, the same similarity hashing algorithm can be used to generate the multiple similarity hashes, or multiple different similarity hashing algorithms can be used. In other words: The similarity hashing algorithm used to generate the attribute values similarity hash can also be used to generate the attribute type similarity hash and/or the attribute similarity hash; however, it is also possible that one or more different similarity hashing algorithm(s) is/are used.

Preferably (but not necessarily), the same similarity hashing algorithm is used to generate a similarity hash for each attribute. However, it is also possible to use different similarity hashing algorithms for different attributes. For example, a similarity hashing algorithm can be selected for an attribute based on its attribute type, so that different similarity hashing algorithms are used for attributes of some attribute types than for attributes of other attribute types. For example, it is possible to use a different similarity hashing algorithm for attributes of the attribute type "number" than for attributes of the attribute type "string".

A semantic similarity hashing algorithm can be used for an attribute for which semantic similarity to other attributes is to be determined (see, e.g.: S. Chaidaroon et al.: *node2hash: Graph aware deep semantic text hashing*, Information Processing & Management, Vol. 57, Issue 6, 2020, 102143). This can be useful, for example, for attributes that contain one or more words that are not used consistently and/or for which there are a several synonyms.

A syntactic similarity hashing algorithm can be used for attributes for which syntactic similarity is to be determined. For example, this can be useful for attributes that rely on a uniform syntax, such as programming codes, binary files, SMILES, gene sequences, and peptide sequences (see, e.g., F. Breitinger, H. Baier: *Properties of a Similarity Preserving Hash Function and their Realization in sdhash*, DOI: 10.1109/ISSA.2012.6320445; J. De Goer De Herve et al.: *A perceptual hash function to store and retrieve large scale DNA sequences*, arXiv:1412.5517).

Figure 1B:
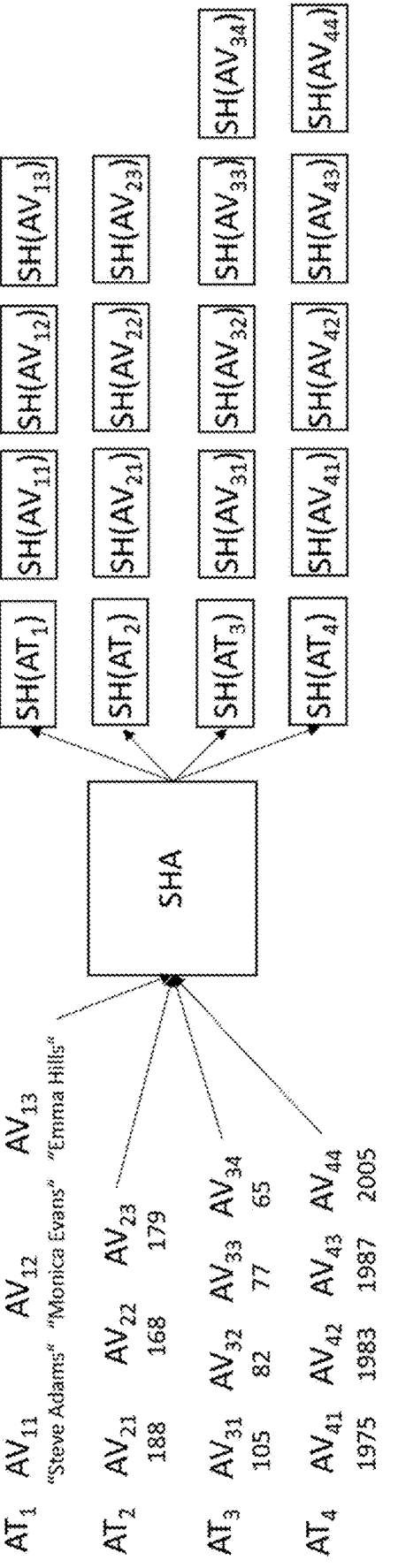
Figure 1C:
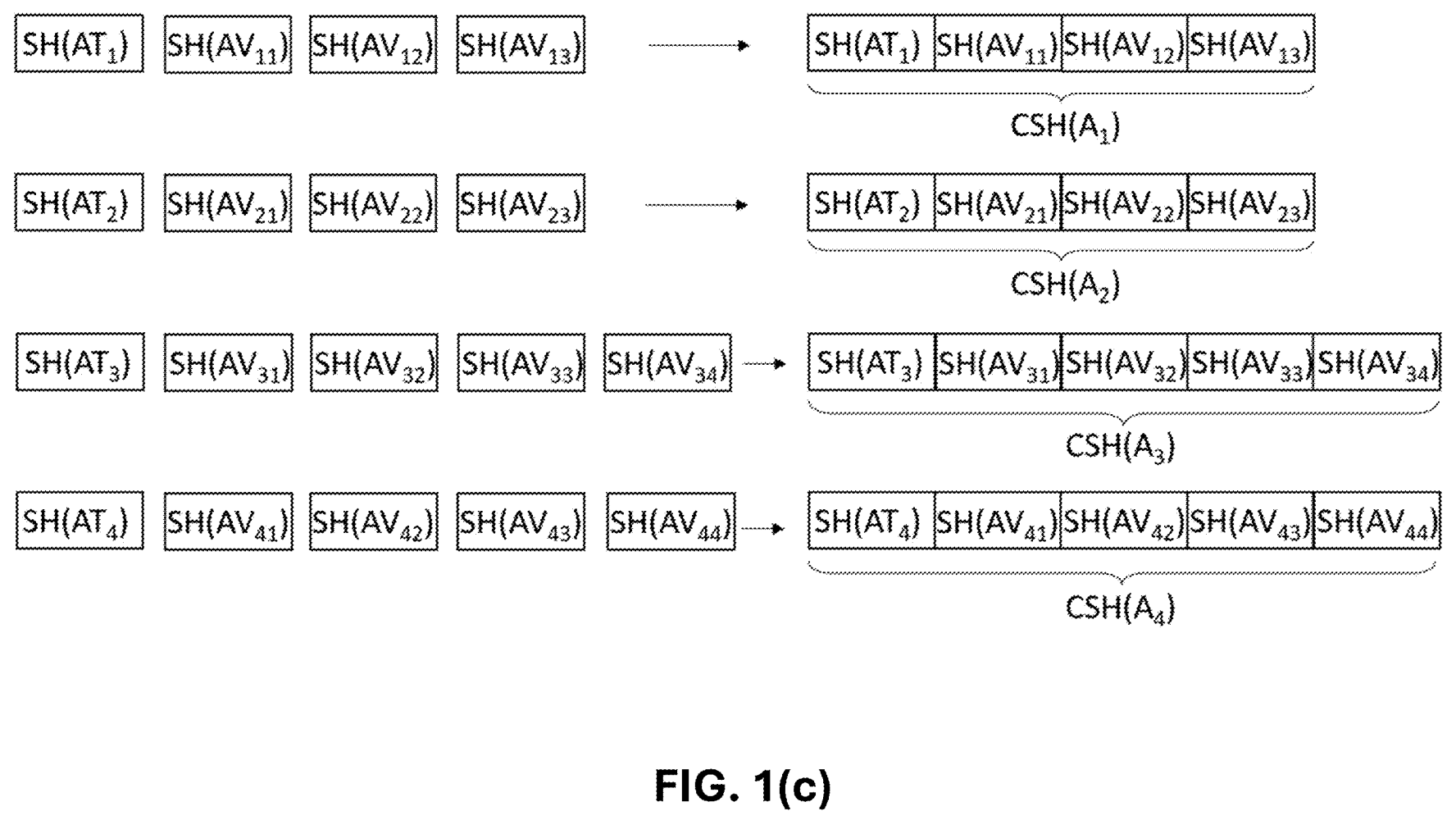

FIGS. 1 (*a*), 1 (*b*), and 1 (*c*) show schematically and exemplarily the generation of similarity hashes for four attributes.

FIG. 1 (*a*) shows a table T. The table T contains the names of patients, their body sizes in centimetres, their body weights in kilograms, and their dates of birth. Patient's Name is a first attribute $A_1$. Body Size is a second attribute $A_2$. Body Weight is a third attribute $A_3$. Date of Birth is a fourth attribute $A_4$. The attribute type $AT_1$ of attribute $A_1$ is string. The attribute type $AT_2$ of attribute $A_2$ is a decimal number. The attribute type $AT_3$ of attribute $A_3$ is a decimal number. The attribute type $AT_3$ of attribute $A_3$ is date.

From each attribute a set of sample attribute values is selected.

In the example shown in FIG. 1 (*a*), for attribute $A_1$ three names are selected randomly: "Steve Adams", "Monica Evans", and "Emma Hills"; for attribute $A_2$ a maximum body size (188), a minimum body size (168), and a mean body size (179) are selected/generated; for attribute $A_3$ four attribute values are selected randomly and sorted by size in descending order (105, 82, 77, 65); and for attribute $A_4$ four years are selected randomly and sorted in ascending chronological order (1975, 1983, 1987, 2005).

In FIG. 1 (*b*), it is shown that the attribute types, and the selected/generated attribute values are fed to a similarity hashing algorithm SHA. The similarity hashing algorithm SHA generates a similarity hash for each individual attribute type, and for each individual attribute values of the selected/generated attribute values.

The similarity hashes for attribute types $AT_1$, $AT_2$, $AT_3$, and $AT_4$ are denoted $SH(AT_1)$, $SH(AT_2)$, $SH(AT_3)$, and $SH(AT_4)$, respectively.

The similarity hashes for the selected attribute values $AV_{11}$, $AV_{12}$, and $AV_{13}$ are denoted $SH(AV_{11})$, $SH(AV_{12})$, and $SH(AV_{13})$, respectively.

The similarity hashes for the selected/generated attribute values $AV_{21}$, $AV_{22}$, and $AV_{23}$ are denoted $SH(AV_{21})$, $SH(AV_{22})$, and $SH(AV_{23})$, respectively.

The similarity hashes for the selected attribute values $AV_{31}$, $AV_{32}$, $AV_{33}$, and $AV_{34}$ are denoted $SH(AV_{31})$, $SH(AV_{32})$, $SH(AVT_{33})$, and $SH(AV_{34})$, respectively.

The similarity hashes for the selected attribute values $AV_{41}$, $AV_{42}$, $AV_{43}$, and $AV_{44}$ are denoted $SH(AV_{41})$, $SH(AV_{42})$, $SH(AVT_{43})$, and $SH(AV_{44})$, respectively.

In the example shown in FIG. 1 (*b*), all similarity hashes are generated using the same similarity hashing algorithm SHA. As described above, it is possible to use different similarity hashing algorithms.

FIG. 1 (*c*) shows how a combined similarity hash is generated for each attribute. In the example shown in FIG. 1 (*c*), the combined similarity hashes are generated by concatenating the individual similarity hashes.

For attribute $A_1$, a combined similarity hash $CSH(A_1)$ is generated by concatenating the attribute type similarity hash $SH(AT_1)$ and the attribute value similarity hashes $SH(AV_{11})$, $SH(AV_{12})$, and $SH(AV_{13})$.

For attribute $A_2$, a combined similarity hash $CSH(A_2)$ is generated by concatenating the attribute type similarity hash $SH(AT_2)$ and the attribute value similarity hashes $SH(AV_{21})$, $SH(AV_{22})$, and $SH(AV_{23})$.

For attribute $A_3$, a combined similarity hash $CSH(A_3)$ is generated by concatenating the attribute type similarity hash $SH(AT_3)$ and the attribute value similarity hashes $SH(AV_{31})$, $SH(AV_{32})$, $SH(AV_{33})$, and $SH(AV_{34})$.

For attribute $A_4$, a combined similarity hash $CSH(A4)$ is generated by concatenating the attribute type similarity hash $SH(AT_4)$ and the attribute value similarity hashes $SH(AV_{41})$, $SH(AV_{42})$, $SH(AV_{43})$, and $SH(AV_{44})$.

It should be noted that the concatenation of the similarity hashes can also be done in a different order than shown in FIG. 1 (*c*).

The combined similarity hashes can be stored as (additional) metadata to the attributes in the catalogue.

In a further step, similarities between attributes of different tables in the database are determined. The similarities are determined based on the combined similarity hashes.

The similarity may be determined with the help of a comparison function. Typically, two combined similarity hashes are fed to the comparison function and the comparison function outputs a similarity score that indicates how similar or how different the two combined similarity hashes are. For example, the similarity score may be a number between 0 and 1, where the value 0 may indicate that the combined similarity hashes have no similarity at all and the value 1 may indicate that the combined similarity hashes are identical. A percentage is also conceivable, where the percentage 0 may indicate that the combined similarity hashes have no similarity and the percentage 100 may indicate that the combined similarity hashes are identical. Other values/range of values are also possible.

If the two combined similarity hashes have the same dimension N, then each combined similarity hash describes a point in N-dimensional space that is associated with an N-dimensional vector starting from the origin of the N-dimensional space. In such a case, the similarity value may be, or at least be based on, a distance measure of the two points or vectors. A measure of the similarity/distance of two vectors can be, for example, the cosine similarity, Euclidean distance, Manhattan distance, Chebyshev distance, Minkowski distance, weighted Minkowski distance, Mahalanobis distance, Hamming distance, Canberra distance, Bray Curtis distance, or any other distance or similarity or a combination thereof.

A distance score $d(CSH(A_1), CSH(A_2))$ between a first combined similarty hash $CSH(A_1)$ and a second similarty hash $CSH(A_2)$ can be converted into a similarity score $s(CSH(A_1), CSH(A_2))$, e.g., by the following equation:

$$s(CSH(A_1), CSH(A_2)) = \frac{1}{1 + d(CSH(A_1), CSH(A_2))}$$

Typically, for the different similarity hashing algorithms, there are associated comparison functions that can be used to determine the similarities of the combined similarity hashes generated based on the different similarity hashing algorithms; reference is made to the literature already cited above.

If the similarity scores are determined in pairs, one or more other attributes (e.g., in other tables) that have the greatest similarity to the attribute can be identified for each attribute based on these similarity scores.

For example, for each attribute, a number of 1, 2, 3, 4, 5, 6, 7, 8, 9, 10, or some other number of other attributes can be identified that are most similar to the attribute. This can be done by ordering the similarity scores in descending order and identifying the corresponding number of other attributes in the order. It is also possible that there is a predefined lower bound value and that those other attributes are identified that have a similarity to a given attribute that is greater than the lower bound value.

Instead of comparing the combined similarity hashes pairwise using comparison function, a clustering of the combined similarity hashes can also be performed, e.g., using k-means clustering or another clustering method. Those attributes whose combined similarity hashes have been assigned to the same cluster can be considered similar to each other.

Thus, for each attribute, one or more other attributes (e.g., in other tables) can be determined that are similar to the attribute. The information about which similar attributes exist for a given attribute can be stored in the catalogue as another piece of information (metadata) about the attribute. Thus, for each attribute, the catalogue includes a combined similarity hash and a list of similar attributes (although such a list may be empty for individual attributes if there are no similar attributes and/or the similarity does not meet predefined requirements, e.g., does not exceed a lower threshold).

When a new entry is added to the database, then the catalogue may be updated.

If a new attribute is added to a table, then an attribute values similarity hash can be generated as described herein. Optionally, an attribute type similarity hash and/or an attribute similarity hash may be generated as well. All generated similarity hashes can be combined (e.g., by concatenation) to generate a combined similarity hash for the new attribute.

Based on the combined similarity hash, similar attributes can be identified in the database. The combined similarity hash and a list of similar attributes can be stored for the newly added attribute as metadata in the catalogue.

If a similar attribute was found for the newly added attribute, the newly added attribute can also be included in the similar attribute list as an attribute that is similar to the similar attribute.

When a new table is added to the database, it is possible to proceed as described above for each attribute of the new table.

If a new attribute value is added for an existing attribute, a new combined similarity hash can be generated for the attribute, which takes the new attribute value into account and which can replace the existing combined similarity hash in the catalogue.

The catalogue may serve as an entry point and filter when searching for information in the database.

A search query may specify what to search for in the database. The search query is typically entered into the computer system of the present disclosure by a user, e.g., via input means (e.g., a keyboard and/or a mouse and/or a touch-sensitive display and/or a microphone and/or other/ further means). However, the search query may also be transmitted from another computer system.

The search query is usually associated with a searched attribute value and/or attribute. For example, a specific name (e.g., of a person or a chemical compound or a biological compound or a product) can be searched for.

Based on the search query, the attribute of the searched attribute value may be located (found) in the catalogue. Metadata of the located attribute provide an information where (in which table(s)) the attribute can be found. The table(s) can then be searched for the searched attribute value and information can be output (e.g., towards the user).

This output information can be a message whether the searched attribute value was found in the database in one or more tables.

This output information can be a message where (in which table) the searched attribute value was found in the database.

This output information can be a column or a row of one or more tables or a plurality of columns and/or rows of one or more tables where the searched attribute value was found.

As described, similar attributes are also listed in the catalogue for individual attributes. It is possible that the searched attribute value can (also) be found in one or more tables under the similar attribute.

Thus, one or more similar attributes can be identified in the catalogue for the attribute of the searched attribute value. The metadata of such similar attributes may refer to tables in which these similar attributes are contained. These tables can be searched for the searched attribute value.

Thus, it is not necessary to search all tables for the searched attribute value; it is sufficient to search the tables that contain the attribute of the searched attribute value and similar attributes. This can make a search for information in the database, such as an attribute value, much more efficient.

Only one attribute must be found in the database that includes the searched attribute value. Using the generated catalogue, similar attributes in the database can then be identified and checked to see if they also include the attribute value being searched for.

Thus, the present disclosure results in less computer resources being used in an information search, less network traffic being generated, and less time being spent on the search.

It is also possible to generate a search query similarity hash based on a search query and compare this search query similarity hash with one or more combined similarity hashes stored in the catalogue to quickly and efficiently locate information in the database.

A search query similarity hash can be generated analogously to a combined similarity hash, except that only one similarity hash of one attribute value (the searched attribute value) is included in the search query similarity hash. Thus, (i) an attribute values similarity hash can be generated from the searched attribute value, and (ii) optionally an attribute type similarity hash can be generated from the attribute type of the searched attribute value, and (iii) optionally an attribute similarity hash can be generated from the attribute of the searched attribute value using one or more similarity hashing algorithm(s). The attribute values similarity hash and the optionally generated attribute type similarity hash, and the optionally generated attribute similarity hash can be combined to form the search query attribute similarity hash, e.g., by concatenating the mentioned similarity hashes.

The search query similarity hash can then be compared, for example, with the combined similarity hash of the attribute to which the attribute of the searched attribute value corresponds. If the comparison results in a low similarity (for example, if the similarity score determined using a comparison function is below a predefined lower threshold), it is unlikely that the attribute stored in the database contains the searched attribute value. If the comparison results in a high similarity (for example, if the similarity score determined using the comparison function is above the predefined lower threshold), it is likely that the attribute stored in the database contains the searched attribute value. In the latter case, the table(s) containing the attribute can be identified and searched to find the searched attribute. In the first mentioned case, no further search is required.

In an analogous way, the attributes that are similar to the attribute stored in the database can be searched: their combined similarity hashes can also be compared with the search query similarity hash to check how likely it is that these similar attributes contain the searched attribute value.

Figure 2:
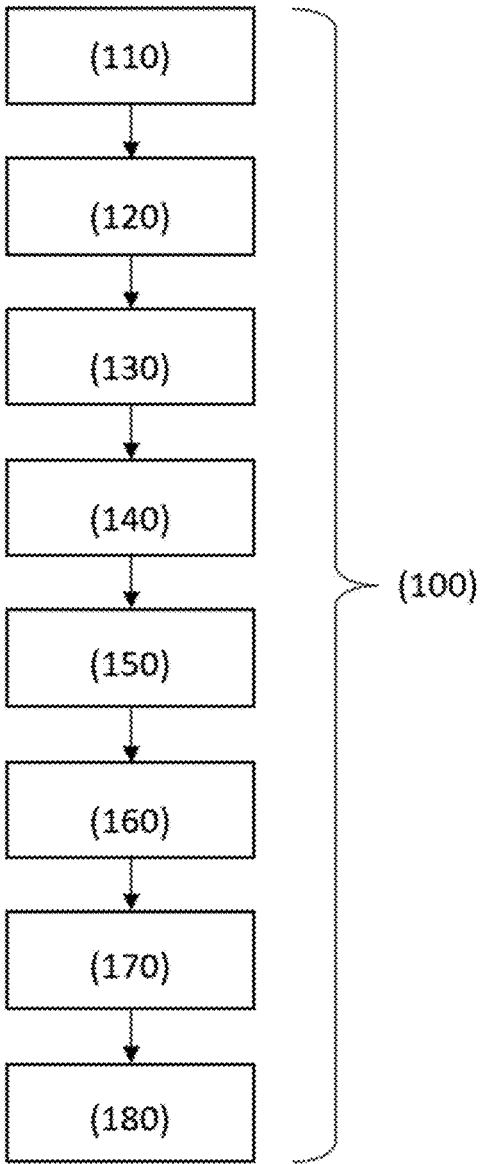
FIG. 2 shows an embodiment of the computer-implemented method of the present disclosure in the form of a flow chart.

FIG. 2 shows an embodiment of the computer-implemented method of the present disclosure in the form of a flow chart.

The method (100) comprises the steps:
- (110) providing a database, the database comprising a multitude of tables, each table comprising a multitude of data elements, each data element being characterized by at least one attribute value of at least one attribute, each attribute being associated with an attribute type,
- (120) generating a similarity hash for each attribute of a multitude of attributes of the database at least partially based on a similarity hash of a sample set of attribute values of the attribute,
- (130) identifying similarities between attributes based on their similarity hashes,
- (140) generating an attribute catalogue based on the similarity hashes of the attributes and the identified similarities,
- (150) receiving a search query, wherein the search query is associated with a searched attribute value of an attribute,
- (160) localizing the attribute of the searched attribute value in the catalogue,
- (170) identifying one or more other attributes similar to the attribute of the searched attribute value based on the catalogue,
- (180) outputting information related to the at least one other attribute.

The operations in accordance with the teachings herein may be performed by at least one computer system specially constructed for the desired purposes or general-purpose computer system specially configured for the desired purpose by at least one computer program stored in a typically non-transitory computer readable storage medium.

A "computer system" is a system for electronic data processing that processes data by means of programmable calculation rules. Such a system usually comprises a "computer", that unit which comprises a processor for carrying out logical operations, and also peripherals.

In computer technology, "peripherals" refer to all devices which are connected to the computer and serve for the control of the computer and/or as input and output devices. Examples thereof are monitor (screen), printer, scanner, mouse, keyboard, drives, camera, microphone, loudspeaker, etc. Internal ports and expansion cards are, too, considered to be peripherals in computer technology.

Computer systems of today are frequently divided into desktop PCs, portable PCs, laptops, notebooks, netbooks and tablet PCs and so-called handhelds (e.g. smartphone); all these systems can be utilized for carrying out the invention.

The term "non-transitory" is used herein to exclude transitory, propagating signals or waves, but to otherwise include any volatile or non-volatile computer memory technology suitable to the application.

The term "computer" should be broadly construed to cover any kind of electronic device with data processing capabilities, including, by way of non-limiting example, personal computers, servers, embedded cores, computing system, communication devices, processors (e.g., digital signal processor (DSP)), microcontrollers, field programmable gate array (FPGA), application specific integrated circuit (ASIC), etc.) and other electronic computing devices.

The term "process" as used above is intended to include any type of computation or manipulation or transformation of data represented as physical, e.g., electronic, phenomena which may occur or reside e.g., within registers and/or memories of at least one computer or processor. The term processor includes a single processing unit or a plurality of distributed or remote such units.

Figure 3:
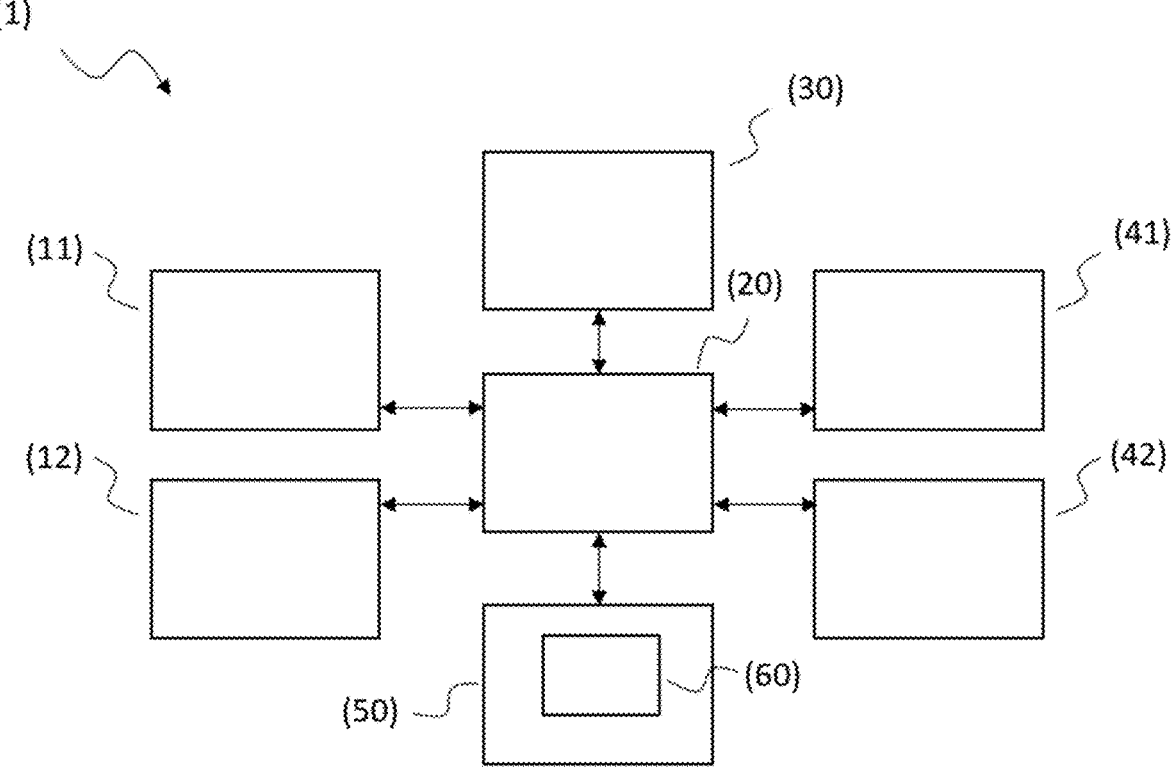
FIG. 3 illustrates a computer system according to some example implementations of the present disclosure in more detail.

FIG. 3 illustrates a computer system (1) according to some example implementations of the present disclosure in more detail.

Generally, a computer system of exemplary implementations of the present disclosure may be referred to as a computer and may comprise, include, or be embodied in one or more fixed or portable electronic devices. The computer may include one or more of each of a number of components such as, for example, a processing unit (20) connected to a memory (50) (e.g., storage device).

The processing unit (20) may be composed of one or more processors alone or in combination with one or more memories. The processing unit (20) is generally any piece of computer hardware that is capable of processing information such as, for example, data, computer programs and/or other suitable electronic information. The processing unit (20) is composed of a collection of electronic circuits some of which may be packaged as an integrated circuit or multiple interconnected integrated circuits (an integrated circuit at times more commonly referred to as a "chip"). The processing unit (20) may be configured to execute computer programs, which may be stored onboard the processing unit (20) or otherwise stored in the memory (50) of the same or another computer.

The processing unit (20) may be a number of processors, a multi-core processor or some other type of processor, depending on the particular implementation. For example, it may be a central processing unit (CPU), a field programmable gate array (FPGA), a graphics processing unit (GPU) and/or a tensor processing unit (TPU). Further, the processing unit (20) may be implemented using a number of heterogeneous processor systems in which a main processor is present with one or more secondary processors on a single chip. As another illustrative example, the processing unit (20) may be a symmetric multi-processor system containing multiple processors of the same type. In yet another example, the processing unit (20) may be embodied as or otherwise include one or more ASICs, FPGAs or the like. Thus, although the processing unit (20) may be capable of executing a computer program to perform one or more functions, the processing unit (20) of various examples may be capable of performing one or more functions without the aid of a computer program. In either instance, the processing unit (20) may be appropriately programmed to perform functions or operations according to example implementations of the present disclosure.

The memory (50) is generally any piece of computer hardware that is capable of storing information such as, for example, data, computer programs (e.g., computer-readable program code (60)) and/or other suitable information either on a temporary basis and/or a permanent basis. The memory (50) may include volatile and/or non-volatile memory, and may be fixed or removable. Examples of suitable memory include random access memory (RAM), read-only memory (ROM), a hard drive, a flash memory, a thumb drive, a removable computer diskette, an optical disk, a magnetic tape or some combination of the above. Optical disks may include compact disk—read only memory (CD-ROM), compact disk—read/write (CD-R/W), DVD, Blu-ray disk or the like. In various instances, the memory may be referred to as a computer-readable storage medium or data memory. The computer-readable storage medium is a non-transitory device capable of storing information, and is distinguishable from computer-readable transmission media such as electronic transitory signals capable of carrying information from one location to another. Computer-readable medium as described herein may generally refer to a computer-readable storage medium or computer-readable transmission medium.

In addition to the memory (50), the processing unit (20) may also be connected to one or more interfaces for displaying, transmitting and/or receiving information. The interfaces may include one or more communications interfaces and/or one or more user interfaces. The communications interface(s) may be configured to transmit and/or receive information, such as to and/or from other computer (s), network(s), database(s) or the like. The communications interface may be configured to transmit and/or receive information by physical (wired) and/or wireless communications links. The communications interface(s) may include interface(s) (41) to connect to a network, such as using technologies such as cellular telephone, Wi-Fi, satellite, cable, digital subscriber line (DSL), fiber optics and the like. In some examples, the communications interface(s) may include one or more short-range communications interfaces (42) configured to connect devices using short-range communications technologies such as NFC, RFID, Bluetooth, Bluetooth LE, ZigBee, infrared (e.g., IrDA) or the like.

The user interfaces may include a display (30). The display (screen) may be configured to present or otherwise display information to a user, suitable examples of which include a liquid crystal display (LCD), light-emitting diode display (LED), plasma display panel (PDP) or the like. The user input interface(s) (11) may be wired or wireless, and may be configured to receive information from a user into the computer system (1), such as for processing, storage and/or display. Suitable examples of user input interfaces include a microphone, image or video capture device, keyboard or keypad, joystick, touch-sensitive surface (separate from or integrated into a touchscreen) or the like. In some examples, the user interfaces may include automatic identification and data capture (AIDC) technology (12) for machine-readable information. This may include barcode, radio frequency identification (RFID), magnetic stripes, optical character recognition (OCR), integrated circuit card (ICC), and the like. The user interfaces may further include one or more interfaces for communicating with peripherals such as printers and the like.

As indicated above, program code instructions (60) may be stored in memory (50), and executed by processing unit (20) that is thereby programmed, to implement functions of the systems, subsystems, tools and their respective elements described herein. As will be appreciated, any suitable program code instructions (60) may be loaded onto a computer or other programmable apparatus from a computer-readable storage medium to produce a particular machine, such that the particular machine becomes a means for implementing the functions specified herein. These program code instructions (60) may also be stored in a computer-readable storage medium that can direct a computer, processing unit or other programmable apparatus to function in a particular manner to thereby generate a particular machine or particular article of manufacture. The instructions stored in the computer-readable storage medium may produce an article of manufacture, where the article of manufacture becomes a means for implementing functions described herein. The program code instructions (60) may be retrieved from a computer-readable storage medium and loaded into a computer, processing unit or other programmable apparatus to configure the computer, processing unit or other programmable apparatus to execute operations to be performed on or by the computer, processing unit or other programmable apparatus.

Retrieval, loading and execution of the program code instructions (60) may be performed sequentially such that one instruction is retrieved, loaded and executed at a time. In some example implementations, retrieval, loading and/or execution may be performed in parallel such that multiple instructions are retrieved, loaded, and/or executed together. Execution of the program code instructions (60) may produce a computer-implemented process such that the instructions executed by the computer, processing circuitry or other programmable apparatus provide operations for implementing functions described herein.

Execution of instructions by processing unit, or storage of instructions in a computer-readable storage medium, supports combinations of operations for performing the specified functions. In this manner, a computer system (1) may include processing unit (20) and a computer-readable storage medium or memory (50) coupled to the processing circuitry, where the processing circuitry is configured to execute computer-readable program code instructions (60) stored in the memory (50). It will also be understood that one or more functions, and combinations of functions, may be implemented by special purpose hardware-based computer systems and/or processing circuitry which perform the specified functions, or combinations of special purpose hardware and program code instructions.

With that said, and as described, it should be appreciated that one or more aspects of the present disclosure transform a general-purpose computing device into a special-purpose computing device (or computer) when configured to perform the functions, methods, and/or processes described herein. In connection therewith, in various embodiments, computer-executable instructions (or code) may be stored in memory of such computing device for execution by a processor to cause the processor to perform one or more of the functions, methods, and/or processes described herein, such that the memory is a physical, tangible, and non-transitory computer readable storage media. Such instructions often improve the efficiencies and/or performance of the processor that is performing one or more of the various operations herein. It should be appreciated that the memory may include a variety of different memories, each implemented in one or more of the operations or processes described herein. What's more, a computing device as used herein may include a single computing device or multiple computing devices.

When a feature is referred to as being "on," "engaged to," "connected to," "coupled to," "associated with," "included with," or "in communication with" another feature, it may be directly on, engaged, connected, coupled, associated, included, or in communication to or with the other feature, or intervening features may be present. As used herein, the term "and/or" and the term "at least one of" includes any and all combinations of one or more of the associated listed items.

Although the terms first, second, third, etc. may be used herein to describe various features, these features should not be limited by these terms. These terms may be only used to distinguish one feature from another. Terms such as "first," "second," and other numerical terms when used herein do not imply a sequence or order unless clearly indicated by the con-text. Thus, a first feature discussed herein could be termed a second feature without departing from the teachings of the example embodiments.

It is also noted that none of the elements recited in the claims herein are intended to be a means-plus-function element within the meaning of 35 U.S.C. § 112(f) unless an element is expressly recited using the phrase "means for," or in the case of a method claim using the phrases "operation for" or "step for."

Again, the foregoing description of exemplary embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method, the method comprising:

providing a database, the database comprising a multitude of tables, each table comprising a multitude of data elements, each data element being characterized by at least one attribute value of at least one attribute, each attribute being associated with an attribute type;

generating a similarity hash for each attribute of a multitude of attributes of the database at least partially based on a similarity hash of a sample set of attribute values of the attribute;

identifying similarities between attributes based on their similarity hashes;

generating an attribute catalogue based on the similarity hashes of the attributes and the identified similarities;

receiving a search query, wherein the search query is associated with a searched attribute value of an attribute;

localizing the attribute of the searched attribute value in the catalogue;

identifying one or more other attributes that are similar to the attribute of the searched attribute value based on the catalogue;

outputting information related to the at least one other attribute.

2. The method of claim 1, wherein generating the similarity hash for each attribute of the multitude of attributes of the database comprises:

selecting a sample set of attribute values of each attribute of the multitude of attributes of the database;

generating an attribute values similarity hash from the selecting sample set.

3. The method of claim 2, wherein generating the attribute values similarity hash from the selecting sample set comprises:

generating a similarity hash from each selected attribute value;

combining the similarity hashes from the selected attribute values, thereby generating the attribute values similarity hash.

4. The method of claim 2, wherein generating the similarity hash for each attribute of the multitude of attributes of the database comprises:

generating an attribute type similarity hash from each attribute type of the multitude of attributes of the database;

combining the attribute type similarity hash with the attribute values similarity hash.

5. The method of claim 1, wherein selecting the sample set of attribute values of each attribute of the multitude of attributes of the database comprises:

selecting a minimum attribute value and/or a maximum attribute value; and/or generating a mean attribute value from the attribute values and selecting the mean attribute value.

6. The method of claim 1, wherein selecting the sample set of attribute values of each attribute of the multitude of attributes of the database comprises:

selecting a predefined number of attribute values and/or a predefined portion of attribute values randomly or according to predefined rules.

7. The method of claim 1, wherein at least one table of the multitude of tables represents one or more chemical and/or biological substances, and attributes of the at least one table represent properties of the chemical and/or biological compound(s).

8. The method of claim 1, wherein at least one table of the multitude of tables represents one or more compositions comprising one or more chemical and/or biological substances, and attributes of the at least one table represent properties of the composition(s).

9. The method of claim 1, wherein at least one table of the multitude of tables represents one or more processes, in particular synthesis processes, production processes, formulations techniques or application techniques, and attributes of the at least one table represent process parameters.

10. The method of claim 1, wherein at least one table of the multitude of tables represents one or more machines, in particular production equipment, packaging equipment, medical equipment for diagnosis and/or therapy of diseases, agricultural machinery for processing agricultural fields and/or greenhouses, sensors, robots, computers, computer peripherals, and/or network components, and attributes of the at least one table represent locations, availabilities, usages, workloads, productivities, and/or maintenance intervals of the machine(s).

11. The method of claim 1, further comprising:

providing the database;

selecting attribute values of each attribute of the multitude of attributes of the database;

generating an attribute values similarity hash from the selected attribute values by:

generating a similarity hash from each selected attribute value and combining the generated similarity hashes to the attribute values similarity hash; or putting the selected attribute values in an order and generating a similarity hash from the order, thereby generating the attribute values similarity hash;

generating an attribute type similarity hash from each attribute type of each attribute of the multitude of attributes of the database;

combining the attribute values similarity hash and the attribute type similarity hash into a combined similarity hash;

identifying similarities between attributes based on their combined similarity hashes;

generating an attribute catalogue based on the combined similarity hashes of the attributes and the identified similarities;

receiving a search query, wherein the search query is associated with a searched attribute value of an attribute;

localizing the attribute of the searched attribute value in the catalogue;

identifying one or more other attributes similar to the attribute of the searched attribute value based on the catalogue;

outputting information related to the at least one other attribute.

12. The method of claim 11, further comprising:

generating an attribute similarity hash from each attribute of the multitude of attributes of the database;

combining the attribute values similarity hash, the attribute type similarity hash, and the attribute similarity hash into the combined similarity hash.

13. The method of claim 1, further comprising:

checking whether the searched attribute value is included in the one or more other attributes.

14. The method of claim 1, wherein the information related to the at least one other attribute is or comprises:

a message whether the searched attribute value was found in the database in one or more tables;

a message where the searched attribute value was found in the database; and/or a column or a row of one or more tables or a plurality of columns and/or rows of one or more tables where the searched attribute value was found.

15. A computer system comprising:

a processor; and a memory storing an application program configured to perform, when executed by the processor, an operation, the operation comprising:

providing a database, the database comprising a multitude of tables, each table comprising a multitude of data elements, each data element being characterized by at least one attribute value of at least one attribute, each attribute being associated with an attribute type;

generating a similarity hash for each attribute of a multitude of attributes of the database at least partially based on a similarity hash of a sample set of attribute values of the attribute;

identifying similarities between attributes based on their similarity hashes;

generating an attribute catalogue based on the similarity hashes of the attributes and the identified similarities;

receiving a search query, wherein the search query is associated with a searched attribute value of an attribute;

localizing the attribute of the searched attribute value in the catalogue;

identifying one or more other attributes that are similar to the attribute of the searched attribute value based on the catalogue;

outputting information related to the at least one other attribute.

16. A computer system comprising a processor configured to execute the following steps:

providing a database, the database comprising a multitude of tables, each table comprising a multitude of data elements, each data element being characterized by at least one attribute value of at least one attribute, each attribute being associated with an attribute type;

generating a similarity hash for each attribute of a multitude of attributes of the database at least partially based on a similarity hash of a sample set of attribute values of the attribute;

identifying similarities between attributes based on their similarity hashes;

generating an attribute catalogue based on the similarity hashes of the attributes and the identified similarities;

receiving a search query, wherein the search query is associated with a searched attribute value of an attribute;

localizing the attribute of the searched attribute value in the catalogue;

identifying one or more other attributes that are similar to the attribute of the searched attribute value based on the catalogue;

outputting information related to the at least one other attribute.

* * * * *